(12) United States Patent
Farrokhi et al.

(10) Patent No.: US 8,378,886 B2
(45) Date of Patent: *Feb. 19, 2013

(54) SIGNAL PROCESSING TECHNIQUES FOR IMPROVING THE SENSITIVITY OF GPS RECEIVERS

(76) Inventors: Farrokh Farrokhi, San Ramon, CA (US); Dickson Wong, Burlingame, CA (US); Arthur J. Collmeyer, Incline Village, NV (US)

(*) Notice: Subject to any disclaimer, the term of this patent is extended or adjusted under 35 U.S.C. 154(b) by 377 days.

This patent is subject to a terminal disclaimer.

(21) Appl. No.: 12/387,888

(22) Filed: May 9, 2009

(65) Prior Publication Data

US 2010/0283672 A1 Nov. 11, 2010

(51) Int. Cl.
G01S 19/42 (2010.01)
G01S 19/35 (2010.01)
(52) U.S. Cl. ............................... 342/357.25; 342/357.75
(58) Field of Classification Search ............. 342/357.21, 342/357.25, 357.46, 357.65, 357.75; 701/213, 701/215, 412
See application file for complete search history.

(56) References Cited

U.S. PATENT DOCUMENTS

| 6,016,119 A * | 1/2000 | Krasner ............... 342/357.34 |
| 7,751,282 B2 * | 7/2010 | Holmes et al. .......... 367/128 |
| 2003/0139879 A1 * | 7/2003 | Krasner .................. 701/213 |

* cited by examiner

Primary Examiner — Dao Phan

(57) ABSTRACT

A system for measuring the pseudo range from a first GPS sensor to a designated navigational satellite, for use in a satellite positioning system (SPS) is comprised of first and second GPS sensors for receiving and recording first and second portions of the signal transmitted by the designated navigational satellite, the recordings referred to as the first and second datagrams. The first and second datagrams are transmitted to a datagram processing facility wherein the pseudo range from the first GPS sensor to the designated navigational satellite is extracted. The datagram processing facility for extracting the pseudo range is further comprised of a pseudo range engine for extracting a pseudo range from a datagram received by the first GPS sensor. The location of which is to be determined, the extraction accomplished with the aid of a perfect reference; and a perfect reference engine for generating a perfect reference from a datagram originating with a second GPS sensor designated for the express purpose of perfect reference generation.

4 Claims, 14 Drawing Sheets

SIGNAL PROCESSING TECHNIQUES FOR IMPROVING THE SENSITIVITY OF GPS RECEIVERS

CROSS-REFERENCE TO RELATED APPLICATIONS

This application claims priority under co-pending U.S. patent application Ser. No. 12/220,612, entitled "Method and Apparatus for Determining Location" filed on Jul. 25, 2008, the subject matter of which is incorporated herein in its entirety.

STATEMENT REGARDING FEDERALLY SPONSORED RESEARCH OR DEVELOPMENT

Not Applicable

BACKGROUND OF THE INVENTION

This invention relates to the determination of location coordinates of devices embodying GPS sensors.

The NAVSTAR Global Positioning System (GPS) developed by the United States Department of Defense uses a constellation of between 24 and 32 Medium Earth Orbit satellites that transmit precise microwave signals, which allows devices embodying GPS sensors to determine their current location. The initial application was predominantly for military purposes, namely weapons targeting and troop deployment. The first widespread consumer based application was navigational assistance. These early applications shared similar operating conditions in that the GPS navigational devices (also called GPS receivers) were (1) used outdoors, and (2) co-located with the end-user. Because of the requirement for mobility, GPS receivers were typically battery-operated devices, with power consumption a critical design consideration.

Today, a new wave of applications is emerging, requiring a wider operating environment, including indoor operation. The major sectors include, government and safety—(emergency location and E-911 services), enterprise and industrial (asset tracking and monitoring), and consumer (location based services). Because current GPS processing techniques are unable to provide the receive sensitivity required for reliable indoor operation, these applications have developed slowly. The major factors impacting indoor and "urban canyon" operation of GPS receivers are (1) path losses due to obstructions between the GPS satellites and the GPS receiver, (2) multi-path fading of the incoming GPS signal, and (3) the requirement to obtain pseudo ranges for a minimum of four GPS satellites in order to determine the three dimensional coordinates of the GPS receiver.

The signals from all the GPS satellites are broadcast using the same carrier frequency, 1.57 GHz in the case of the NAVSTAR system. However, each satellite has a unique identifier, or pseudorandom noise (PRN) code having 1023 chips, thereby enabling a GPS receiver to distinguish the GPS signal from one GPS satellite from the GPS signal from another GPS satellite. In addition, each satellite transmits information allowing the GPS receiver to determine the exact location of the satellite at a given time. The GPS receiver determines the distance (pseudo range) from each GPS satellite by determining the time delay of the received signal. The pseudo range information includes a local time offset to each GPS satellite from the time-of-arrival of the PRN code, the Zcount and ephemeris parameters in the GPS signal that it receives from that GPS satellite. The determination of three-dimensional location coordinates can be accomplished with as few as three satellite pseudo ranges, provided they are measured using a time reference. Since this is impractical with current GPS navigational platforms, the computation of location coordinates is generally accomplished using four pseudo ranges. This is illustrated in FIG. 1, where pseudo range information 15, 16, 17, 19 is used to determine the location coordinates of GPS receiver 10. Once the pseudo ranges for at least four GPS satellites have been determined, it is a straightforward process to determine the location coordinates of the GPS receiver.

FIG. 2 describes the data structure of the signal that is broadcast by each GPS satellite, where the signal contains 50 Hz data overlay signal—20 millisecond data bits modulating a one millisecond PRN code interval of 1023 bits or chips. The PRN code is known as a spreading code because it spreads the frequency spectrum of the GPS signal. This spread spectrum signal is known as a direct sequence spread spectrum (DSSS) signal.

Indoors, or in urban canyons, the satellite signals reach the receiver by multiple paths. The result is a signal that is the composite of multiple instances of the transmitted signal, each reduced in power and differentially delayed. All things being equal, the sensitivity of a receiver is effectively reduced in such a multi-path environment. In strong signal communications applications, adaptive equalization techniques have been employed to combat the effects of multi-path—to prevent, for example the destructive combination of multiple instances of the transmitted signal, delayed relative to each other. To date, no such technology has been developed for applications in which the signal is buried in noise, such as satellite positioning. So, whereas a GPS receiver out in the clear is likely to see a single instance of a given satellite transmission, indoors the receiver is likely to see multiple variously-attenuated instances, delayed relative to each other, as shown in FIG. 3. The impact of this can be confounding to the prior art GPS receivers described in the paragraphs which follow.

FIG. 4 illustrates a block diagram of a prior art GPS receiver. The GPS signal from GPS satellite constellation 36 is received by the R/F front end 31 of GPS receiver 30. R/F front end 31 down converts the 1.57 GHz R/F signal, resulting in an intermediate frequency (I/F) signal. The streaming I/F signal is examined by correlator 32, which employs a search algorithm to confirm the presence or absence, within the composite GPS signal, of a component signal from one of the GPS satellites. In a typical search algorithm, the local frequency 33 is scanned across a range of frequencies; for each frequency, a series of correlations involving the incoming GPS signal and all possible code phases of a local replica 34 of the designated satellite's PRN code are used to "acquire" (i.e., determine the presence or absence of) the designated satellite. In order to ensure that the correct code phase is not missed due to local clock off-set, it is conventional to increment the local replica code phase in one-half chip or even smaller steps. The granularity of these steps is limited by the amount of over sampling that is performed on the incoming I/F signal. A high correlation peak value indicates that the designated satellite is present. If no correlations peaks are high enough, the local frequency 33 is set to a second trial frequency and the correlations are repeated. Once pseudo range information has been obtained for at least four GPS satellites along with the corresponding satellite timing information, the coordinate generator 35 determines the three-dimensional location coordinates of the GPS receiver 30. There are a number of drawbacks to this approach, including a long time to first fix (TTFF) and reduced receive sensitivity in certain situations (e.g., those involving severe path loss or multi-path).

The TTFF for GPS receiver 30 generally includes (1) the time to acquire a GPS satellite by tuning the local frequency 33 and the code phase of the local PRN code replica 34 in the GPS receiver to match the carrier frequency and the PRN code phase of the designated satellite, (2) the time to receive data bits in the GPS signal to determine a GPS clock time, (3) the time to receive ephemeris parameters in the GPS data bits, and (4) the time to process the code phase timing, GPS clock time and ephemeris for determining a position.

In order to overcome the TTFF disadvantages of GPS receiver 30, a prior art GPS receiver 50, with GPS assistance system 59 has been introduced (see FIG. 5). The role of GPS assistance system 59 is to track, the satellites "acquirable" in the vicinity of GPS assistance system 59. Accordingly, the GPS signal from GPS satellite constellation 56 is received by the R/F front end 51 of GPS receiver 50. R/F front end 51 down converts the 1.57 GHz R/F signal, resulting in an intermediate frequency (I/F) signal. The streaming I/F signal is examined by correlator 52, which is used to acquire satellites. To expedite the acquisition process, frequency information derived by GPS assistance system 59 in the course of tracking acquirable satellites, is transmitted to GPS receiver 50. This information is used to set the local frequency used by the search algorithm of correlator 52, enabling the search algorithm to operate more efficiently and more effectively. As a result the TTFF is significantly reduced, and receive sensitivity is improved slightly at the margin. Once pseudo range information has been determined for a minimum of four GPS satellites, the location coordinates are determined by coordinate generator 55. In addition to frequency information, ephemeris parameters may be transmitted to GPS receiver 50 from GPS assistance system 59. This information, however, does not affect the receive sensitivity of GPS receiver 50.

To enable operation in indoor or urban canyon environments, GPS receivers must cope successfully with (1) path loss between the GPS satellites and the GPS receiver, (2) multi-path fading of the incoming GPS signal, and (3) the requirement to obtain the pseudo range information for at least four GPS satellites in order to determine the location coordinates of the GPS receiver. The ability of GPS receivers 30 and 50 to reliably obtain a GPS fix in indoor and urban canyon environments has been shown to be severely limited. The explanations relate in large measure to the signal processing techniques employed in current receivers. Consider first the fact that correlator 32 uses an iterative-search algorithm to acquire a particular GPS satellite from a streaming composite I/F signal. Furthermore, complicating the satellite acquisition process is the fact that the I/F signal carries a 50 Hz data overlay signal with bit boundaries occurring after 20 consecutive PRN code intervals. Consequently, the amount of data that the correlator is capable of examining in order to acquire a particular satellite is typically much less than 20 msec. The 50 Hz data overlay signal thus precludes processing gains that could otherwise be achieved by examining more of this highly repetitive data.

To surmount the barrier imposed by the 50 Hz data overlay and enable the correlator to examine substantially larger amounts of data is impractical within the envelope of a battery-powered handheld device. A third prior art GPS receiver, exemplified by Geotate's implementation of GPS receiver 30, as it were, on the Personal Computer, is unencumbered by these limitations, as it performs the iterative correlations in software, off-line. While it represents an interesting repartitioning of the basic GPS receiver, the rearchitecting essential to improve the sensitivity of the basic GPS receiver has not been addressed.

Since none of the prior art techniques are capable of providing reliable indoor and urban canyon operation, there is a need in the art for a method of improving the receive sensitivity of GPS-enabled devices, consistent with the requirements of the emerging E-911, asset management, and location-based consumer applications.

BRIEF SUMMARY OF THE INVENTION

In general, the object of the present invention is to provide methods and apparatus to increase the receive sensitivity of GPS receivers in order to provide for the reliable determination of location coordinates in indoor and urban canyon operation. To this end, novel signal processing techniques reducing the minimum signal strength required to acquire a satellite in indoor and urban canyon environments are disclosed. The use of multiple GPS sensors provides the conceptual framework for such techniques. In this context, GPS sensors are characterized as one of two types: target GPS sensors, whose location is to be determined; and reference GPS sensors, used in the derivation of a reference used to increase the receive sensitivity of target GPS sensors.

The reduction in the minimum signal strength required to acquire a satellite (characterized as an increase in receive sensitivity) results from two types of innovation.

To enable these innovations, the prior art GPS receiver has been rearchitected, as described in FIG. 6. In addition to the repartitioning of the basic functions—opening the signal processing platform to sophisticated techniques—the concept of the perfect reference is introduced, which in turn enables the second innovation—a buried-signal equalization technique effective in reducing if not eliminating the effects of multi-path.

Specifically, the invention postulates the embedding of simple GPS sensors at the points of measurement, receiving and recording signals transmitted by navigational satellites, and forwarding the recordings (datagrams) to central datagram processing facilities. Significant in this partitioning is the fact that this enables a practical solution to the challenge of processing large datagrams, which in turn enables signal processing gains that translate into a reduction in the minimum signal strength required to acquire a satellite.

Exploiting the opportunity enabled by this repartitioning, and mindful of the utility of multiple sensors, a signal processing technique called perfect reference generation has been developed. Perfect reference generation is a novel technique for optimizing the extraction of pseudo ranges from datagrams recorded at target GPS sensors, whether by correlation or by equalization techniques. The perfect reference, extracted from a datagram recorded at a reference GPS sensor designated for the express purpose of perfect reference generation, is a reconstruction of the transmitted signal based on the analysis of large datagrams. In the process of perfect reference generation, satellite timing is derived, thus eliminating the requirement for a fourth satellite to fix location coordinates, and further reducing the minimum signal strength required to acquire a satellite.

Finally, classic equalization concepts have been adapted to the case in which the signal is buried in noise; with the leverage of the perfect reference, the recombination of multi-path signals is reduced to a tractable mathematical formulation. As a result, the minimum signal strength required to acquire a satellite is reduced even further.

In accordance with the present invention, a system for measuring the pseudo range from a first GPS sensor to a designated navigational satellite, for use in a satellite positioning system (SPS) is presented, comprising:

first and second GPS sensors for receiving and recording first and second portions of the signal transmitted by the designated navigational satellite, the recordings hereinafter referred to as the first and second datagrams;

means for transmitting the first and second datagrams to a datagram processing facility; and a datagram processing facility wherein:

a perfect reference is generated from the second datagram, and wherein:

the pseudo range from the first GPS sensor to the designated navigational satellite is extracted from the first datagram using a signal processing technique employing the perfect reference.

In another embodiment, the second GPS sensor is one of a set of stationary GPS sensors designated for the purpose of perfect reference generation.

In yet another embodiment, the datagram processing facility for extracting the pseudo range from a first GPS sensor to a designated navigational satellite from a datagram originating with said first GPS sensor is comprised of:

a pseudo range engine for extracting a pseudo range from said datagram originating with said first GPS sensor, the extraction accomplished with the aid of a perfect reference, and a perfect reference engine for generating a perfect reference from a datagram originating with a second GPS sensor, designated for the purpose of perfect reference generation.

In yet another embodiment, the perfect reference engine processes large datagrams.

In yet another embodiment, the perfect reference engine generates a perfect reference with frequency, phase, and channel compensation.

In yet another embodiment, the pseudo range engine provides for the recombination of multi-path signals.

Those skilled in the art will understand that the perfect reference engine and the pseudo range engine may be implemented in mixed signal circuitry, including logic circuits and/or a microprocessor with appropriate software or firmware. Further, those skilled in the art will understand that the methods and apparatus of the present invention may be applied to satellite positioning systems evolved from the GPS satellite positioning system, including but not limited to the Galileo and Glasnost systems.

Various aspects and features of the present invention may be understood by examining the drawings here listed.

DETAILED DESCRIPTION OF THE INVENTION

In general, the object of the present invention is to provide methods and apparatus to increase the receive sensitivity of GPS receivers in order to provide for the reliable determination of location coordinates in indoor and urban canyon operation. To this end, novel signal processing techniques reducing the minimum signal strength required to acquire a satellite in indoor and urban canyon environments are disclosed. The use of multiple GPS sensors provides the conceptual framework for such techniques. In this context, GPS sensors are characterized as one of two types: target GPS sensors, whose location is to be determined; and reference GPS sensors, used in the derivation of a reference used to increase the receive sensitivity of target GPS sensors.

Figure 1:
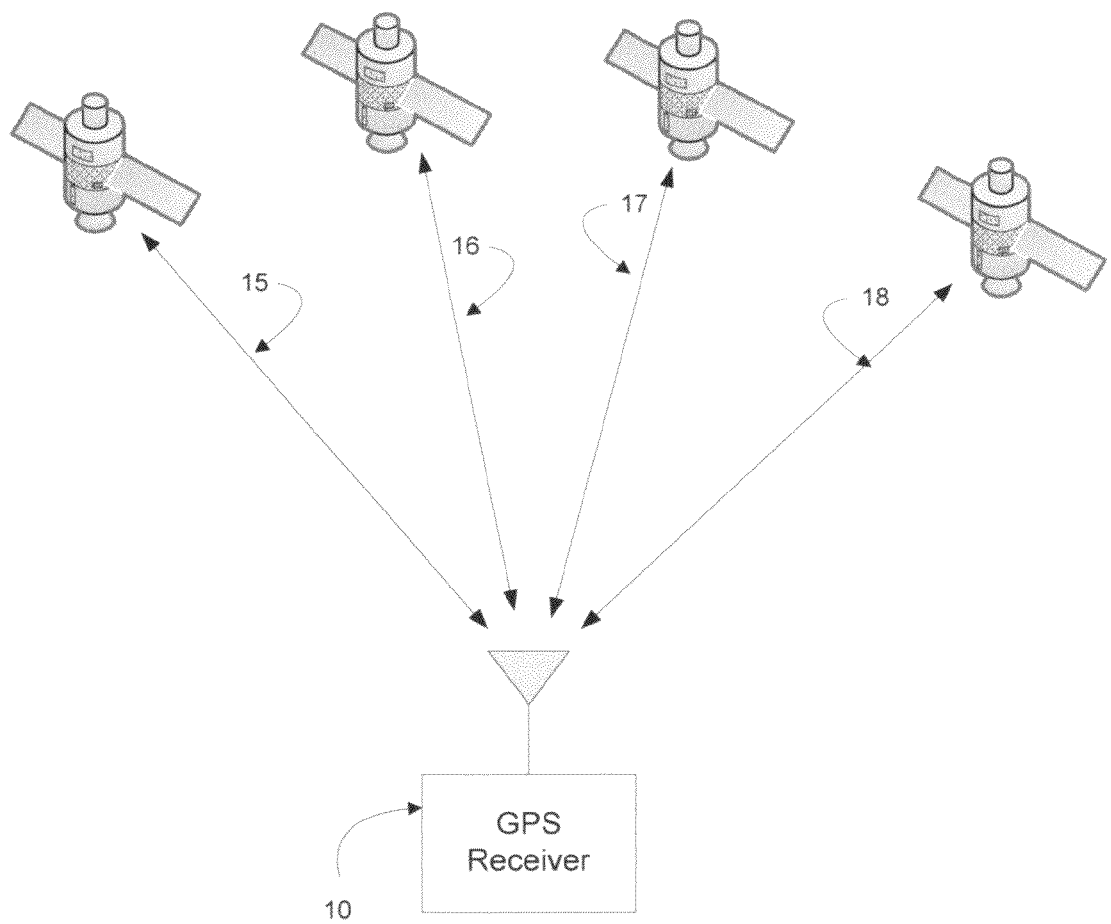
FIG. 1 shows the system diagram of a GPS satellite positioning system (SPS)
Figure 2:
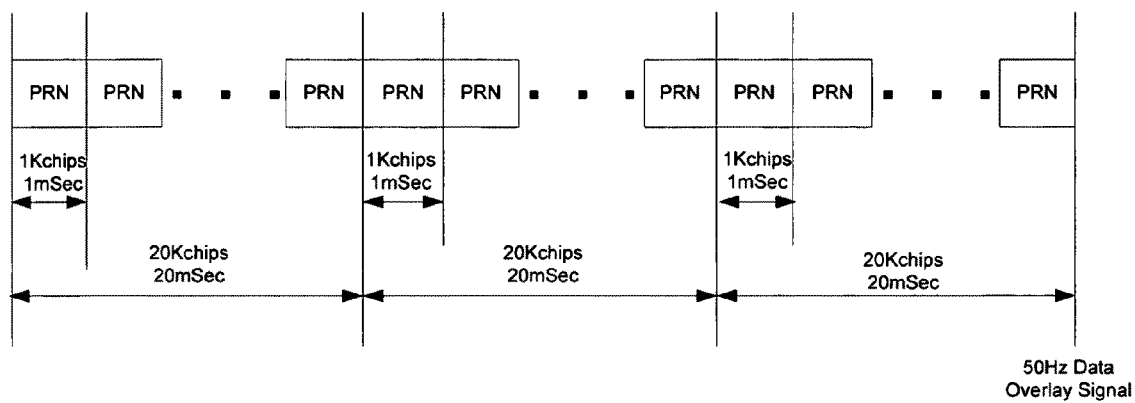
FIG. 2 describes the data structure transmitted by a GPS satellite
Figure 3:
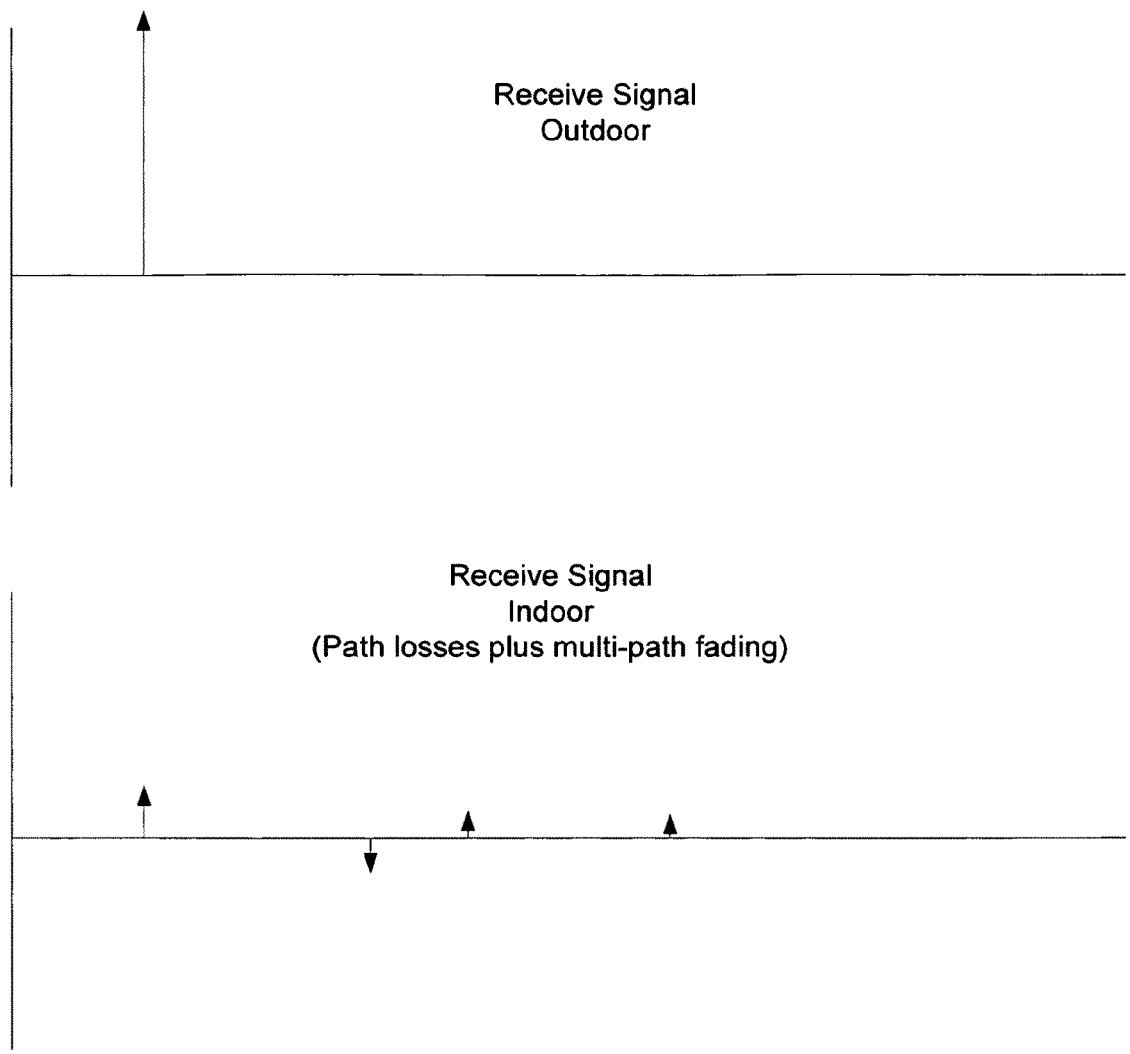
FIG. 3 illustrates the signal degradation resulting from multi-path
Figure 4:
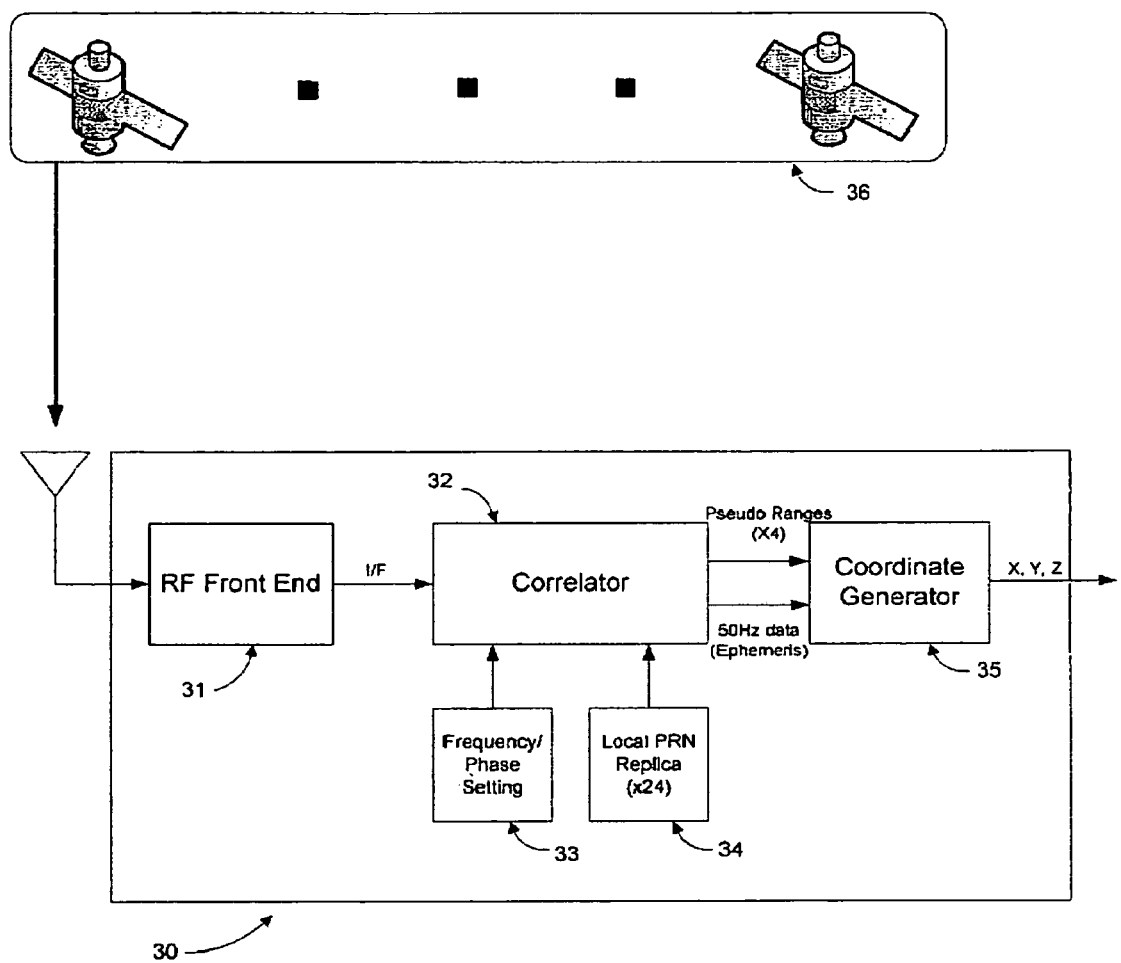
FIG. 4 shows a block diagram of a prior art GPS receiver
Figure 5:
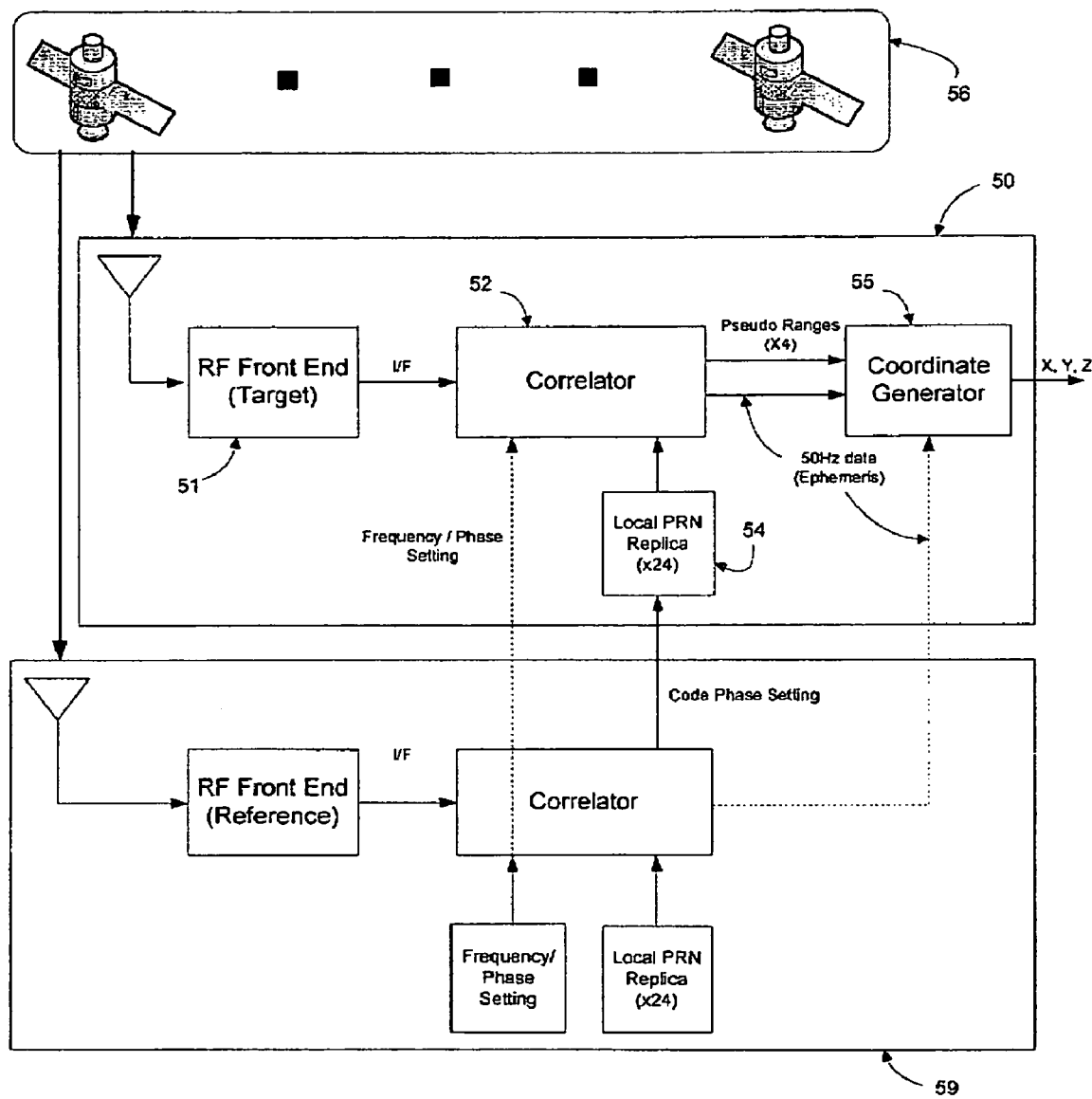
FIG. 5 shows a block diagram of a prior art assisted-GPS receiver
Figure 6:
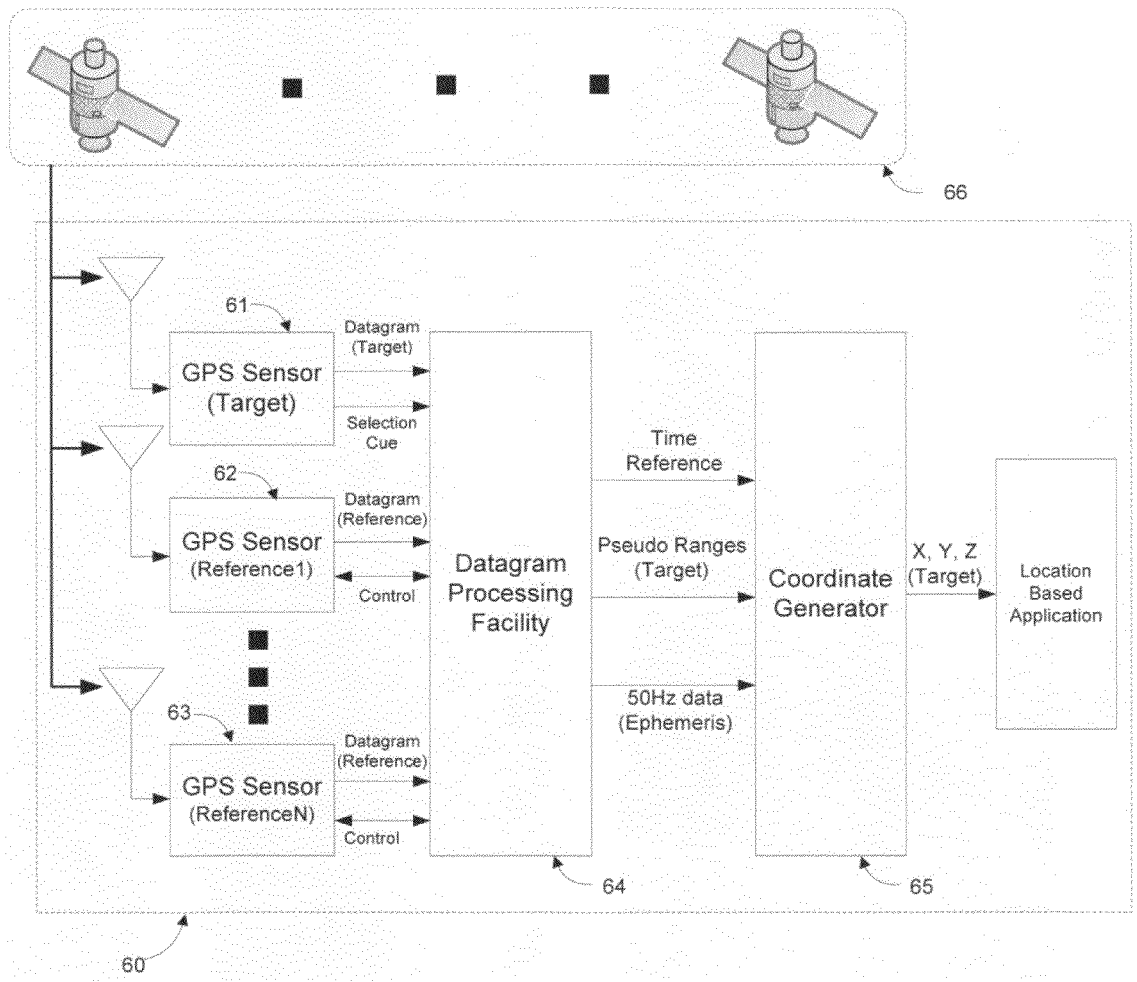
FIG. 6 shows a block diagram of a satellite positioning system (SPS) employing the present invention

The reduction in the minimum signal strength required to acquire a satellite (characterized as an increase in receive sensitivity) results from innovations in signal processing, enabled by the rearchitecting of prior art GPS receivers, as described in FIG. 6. The repartitioning of the basic functions—opening the signal processing platform to sophisticated techniques—enables the architectural innovations essential to achieving the improvements in receive sensitivity required for reliable indoor and urban canyon operation.

As shown in FIG. 6, the invention postulates the embedding of simple GPS sensors 61 with mobile devices that either host or serve as peripherals in location-based applications. These target GPS sensors receive and record signals transmitted by navigational satellites, and forward their recordings (datagrams) to a Datagram Processing Facility. The invention further postulates a set of one or more GPS sensors 62 & 63 embedded in devices deployed for the purpose of providing the Datagram Processing Facility reference datagrams useful in extracting the pseudo range information critical to fix the location of mobile devices.

The reference sensors may be stationary or mobile. The presumption is, however, that they are stationary, in known locations, and positioned for unobstructed reception of satellite signals. Accordingly, positioning accuracy based on pseudo ranges measured at these GPS sensors can be further improved through a reconciliation of their measured location with their known location to correct for atmospheric effects, as is done with WAAS data.

The Datagram Processing Facility 64 processes overlapping datagrams from target and reference GPS sensors, in order to extract the information essential to fix the location of the target sensor. In general, one reference datagram and one target datagram, overlapping at least partially in time, are used (once per satellite) to fix the location. In the event there are multiple reference sensors, the choice of which reference sensor/datagram to use is made by the Datagram Processing Facility. To make constructive choices, the Datagram Processing Facility accepts cues from target sensors (or their proxies), and monitors and controls the reference sensors. To illustrate, a target sensor may be embedded in a cellular phone, and so be able to provide, along with its datagram, the identity of the base station through which it is transmitting, or a location derived from the relative strength of signals from three nearby base stations. Such a cue could be used to estimate the location of the target sensor, which estimate could figure in the choice of reference sensor/datagram to be used, in combination with the target datagram, to fix the location of the target sensor. The ability to control the reference sensors has numerous uses, from turning them off and on to extend battery life, to varying the datagram length to adapt to atmospheric conditions.

Outputs of the Datagram Processing Facility include 1) optionally a time reference, 2) optionally the reference pseudo range to each of four acquired satellites, 3) the 50 HZ data stream for each acquired satellite, and 4) the target pseudo range to each of three (or four) acquired satellites. These outputs are processed by coordinate generator 65 into target location coordinates formatted for location-based applications.

The physical implementation of the Datagram Processing Facility can take many forms. For location-based applications that are also networked, applications, the most practical as well as the most cost-effective implementation takes the form of a server, or network of servers. In this case, the logical implementation of the functionality of the Datagram Processing Facility takes the form of software, accelerated as necessary by specialized hardware (e.g., FFT hardware).

Significant in this sensor-server partitioning is the fact that it enables a practical solution to the challenge of processing large datagrams—datagrams that span hundreds of PRN code intervals—which in turn enables signal processing gains that translate into a reduction in the minimum signal strength required to acquire a satellite. Further, this partitioning facilitates advanced signal processing techniques such as perfect reference generation. Perfect reference generation is a novel technique for optimizing the extraction of pseudo ranges from datagrams recorded at target GPS sensors, whether by correlation or by equalization techniques. The perfect reference is extracted from a datagram recorded at a reference GPS sensor, selected from a set of one or more reference sensors to optimize the efficiency and efficacy of the perfect reference generation process.

The Datagram Processing Facility

Figure 7:
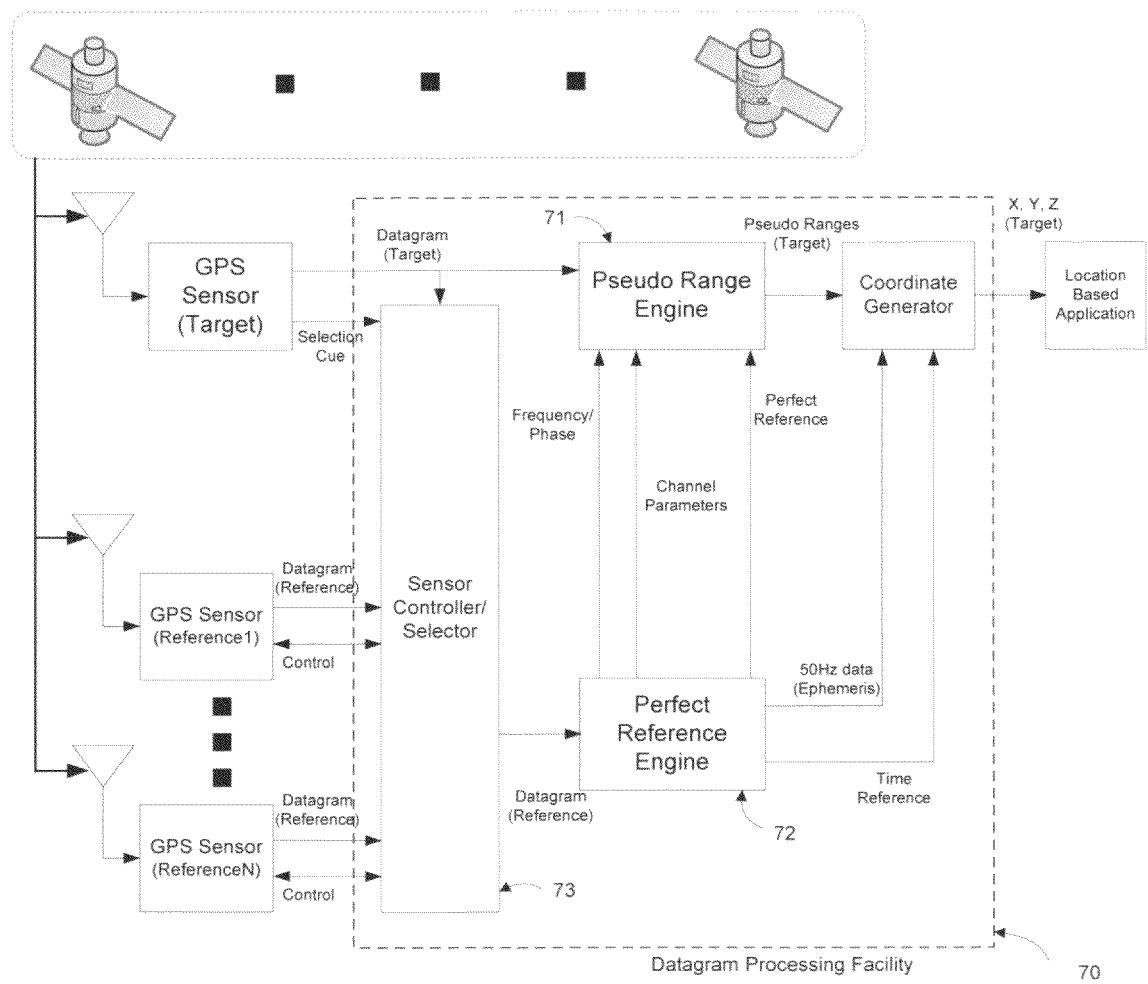
FIG. 7 shows a block diagram of a datagram processing facility employing the present invention

FIG. 7 describes a Datagram Processing Facility. The principle elements are 1) the Pseudo Range Engine 71, 2) the Perfect Reference Engine 72, and 3) the Sensor Controller/Selector 73. The Sensor Controller/Selector 73 has two major functions. The control function ensures that the reference GPS sensor or sensors are on-line and performing, delivering reference datagrams suitable for use in fixing the locations of target GPS sensors. Where a set of reference sensors includes mobile sensors, the control function includes turning the on and off to extend battery life, and to initiate a service call to replace a weak battery.

In the event the set of reference sensors includes multiple sensors, the selector function selects from the set, a reference sensor/datagram to be used to generate a perfect reference for use in fixing the location implicit in each target datagram as it arrives at the Datagram Processing Facility 70. This selection may be performed using any number of criteria. In the absence of a cue, the selection process might evaluate the target datagram to determine the satellite most "visible" to the target sensor, and select the reference sensor responding similarly. In the event a cue is provided, the selection process would be cue-based, as in the example described above.

Stationary sensors, unlike mobile sensors, will typically stream data continuously. In this case the selection process would, additionally, perform the function of forming datagrams from the streaming data. The datagrams formed could be fixed and overlapping, or they could be variable and overlapping, where the length is determined by an evaluation of the target datagram to determine the overall strength of satellite signals at the target sensor.

The Perfect Reference Engine 72 receives the selected reference datagram from the Sensor Controller/Selector 73 and processes it to obtain—in addition to the perfect reference—frequency, phase, and channel characterization parameters, the 50 Hz data stream (carrying ephemeris data, etc.), and a time reference. The frequency and channel characterization parameters together with the perfect reference are used by the Pseudo Range Engine 71 to extract target pseudo ranges from the target datagram. The 50 Hz data stream and the time reference are used by the Coordinate Generator to process the target pseudo ranges into target coordinates for used by location-based applications.

Absent a time reference generator, two alternative solutions are possible. In the first, the four reference pseudo ranges extracted in the correlation process are presented directly to the Coordinate Generator, where the time reference is generated. In the second, four target pseudo ranges are presented to the coordinate generator by the Pseudo Range Engine. The assumption implicit in the latter is that four satellites are acquirable from the target datagram, eliminating the opportunity to fix the position of the target GPS sensor when just three satellites are acquirable.

Figure 11:
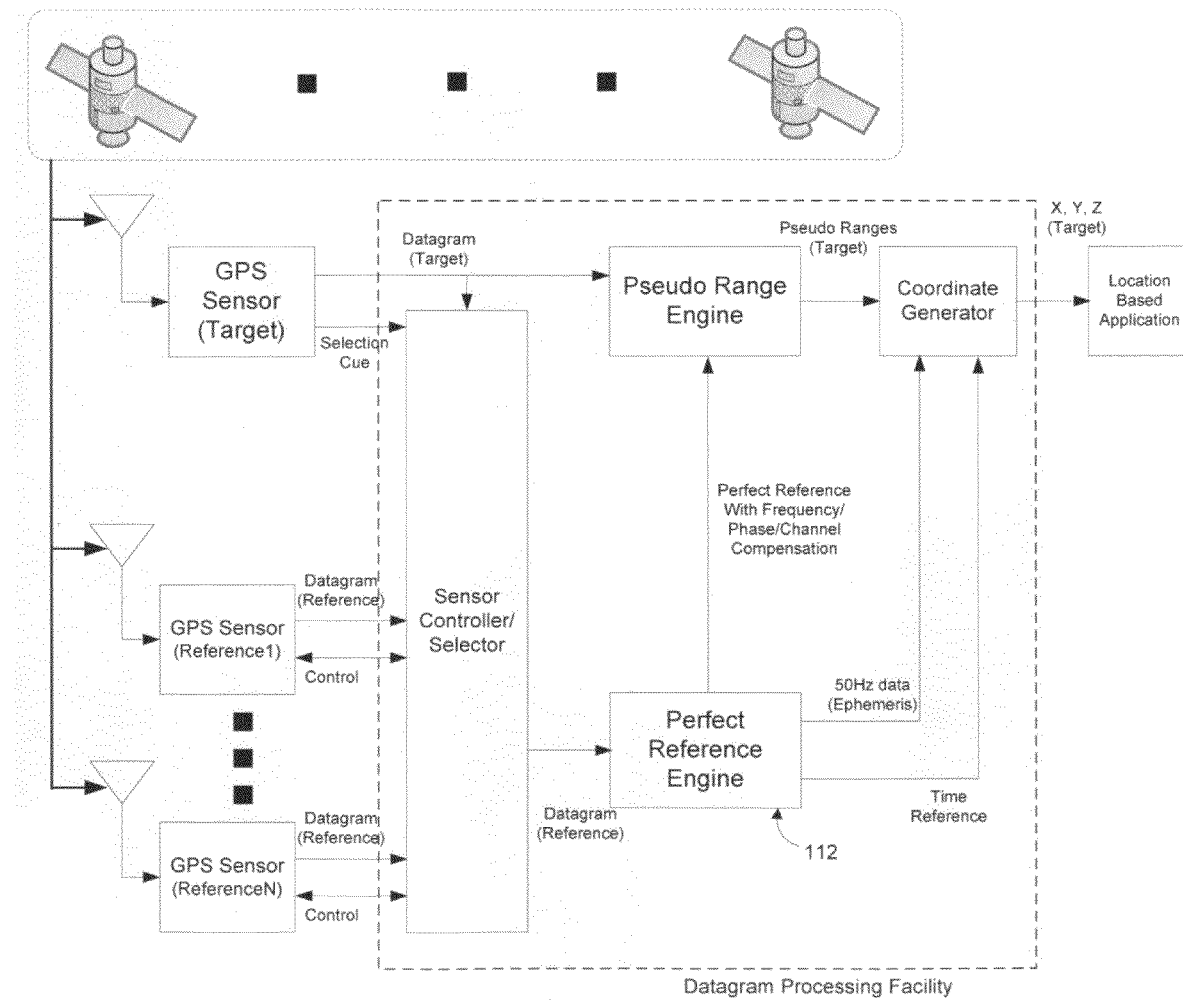
FIG. 11 shows a block diagram of a datagram processing facility employing the present invention

In a second embodiment of the Datagram Processing Facility (FIG. 11), the frequency, phase, and the channel characterization parameters are applied within the Perfect Reference Engine 112 to generate a perfect reference preconditioned to allow for the trivial extraction of target pseudo ranges from target datagrams.

The Perfect Reference Engine

At one level, the Perfect Reference Engine 80 (FIG. 8) looks like a prior art GPS receiver with added functionality. The implementation is different in several respects. First, because the locations of the reference GPS sensors are known, the most acquirable satellites are also known; hence the number of correlators comprising Correlator 81 can be reduced to as few as four, provided the mechanism exists for a second pass in the event a mismatch is discovered between the four satellites chosen in the first pass and those present in the target datagram. Second, because the datagrams are large, to enable the extraction of a precision time reference, the correlation is lengthened; and to avoid the problems introduced by local oscillator drift, the reference GPS sensors employ precision oscillators. The time required to extract the reference pseudo ranges is minimized by careful coding of the correlation computation and by intelligently implementing the frequency search. To minimize the effect of potential start-up transients (occurring when one satellite drops off and another appears), an additional correlator could be added to the set to facilitate a smooth transition. Practically, this may be a non issue, as the Sensor Controller/Selector, with the responsibility for insuring that the reference GPS sensors are at the ready, would most likely be scheduling periodic position fixes for the purpose of determining the frequency and PRN code phase for currently acquirable satellites, insuring that search times remain within a reasonable bound.

Figure 8:
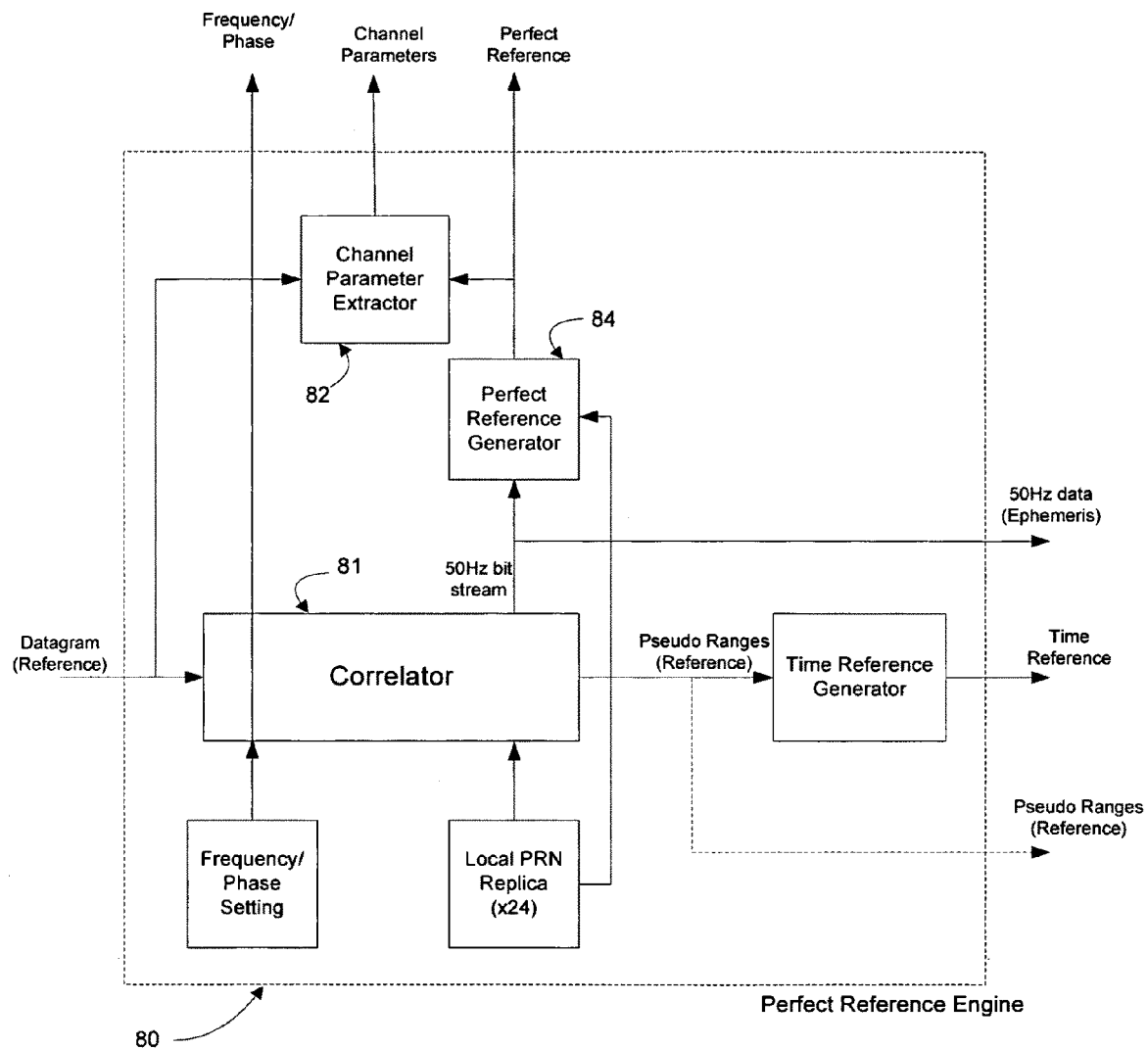
FIG. 8 shows a block diagram of a perfect reference engine employing the present invention.

The remaining blocks in FIG. 8—the optional Channel Parameter Extractor 82 and Time Reference Generator 83, and the Perfect Reference Generator 84—require little elaboration. The computation of the time reference from four reference pseudo ranges, chosen on the basis of quality grade (described subsequently under "Pseudo Range Engine), is well known in the art. The Channel Parameter Extractor 82 simply compares the reference datagram with the perfect reference to extract channel characterization parameters for use by the Pseudo Range Engine. Channel parameter extraction techniques are likewise well known in the art. The function of the Perfect Reference Generator 84 follows trivially from the definition of the perfect reference; namely, that it is a reconstruction of the transmitted signal, based on the analysis of a large datagram, and timed precisely, to enable the determination of the location coordinates of a target GPS sensor from pseudo ranges to three (or four) of the navigation satellites. Accordingly, the Perfect Reference Generator 84 involves simply synching up the local PRN code replica with the 50 Hz bit stream and combining the two.

Figure 12:
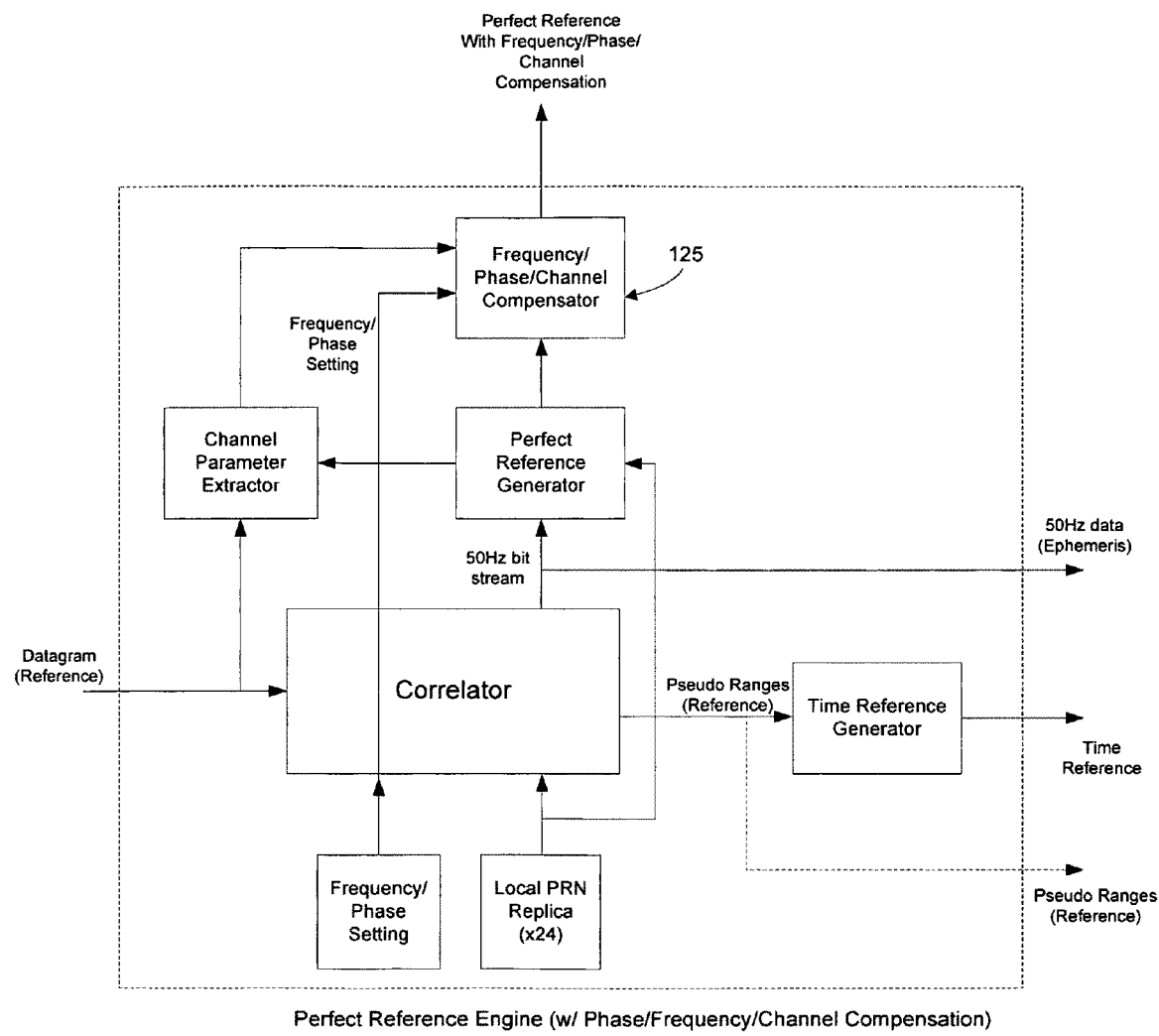
FIG. 12 shows a block diagram of a perfect reference engine incorporating frequency, phase, and channel compensation.
Figure 13:
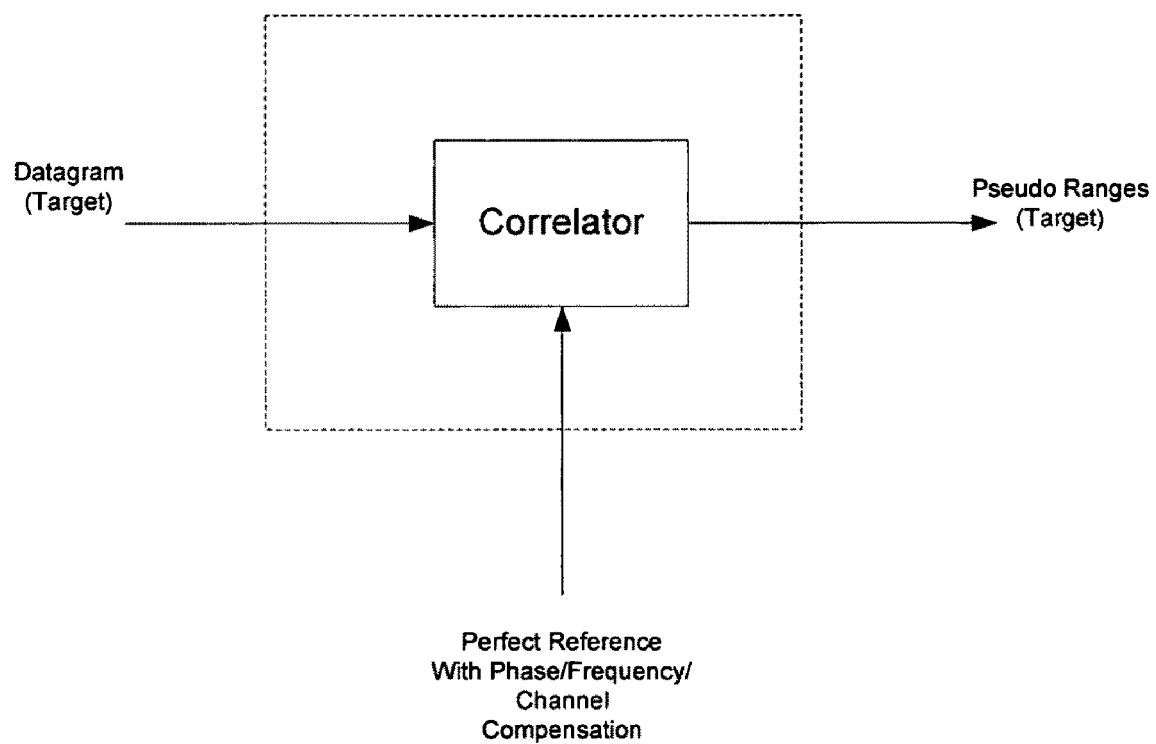
FIG. 13 shows a block diagram of a pseudo range engine utilizing the perfect reference with frequency, phase, and channel compensation.

In a second embodiment of the Perfect Reference Engine (FIG. 12), the frequency, phase, and channel characterization parameters are applied (using Frequency/Phase/Channel Compensator 125) to the perfect reference, pre-conditioning the perfect reference to enable the trivial extraction of target pseudo ranges from target datagrams (FIG. 13).

The Pseudo Range Engine

Figure 9:
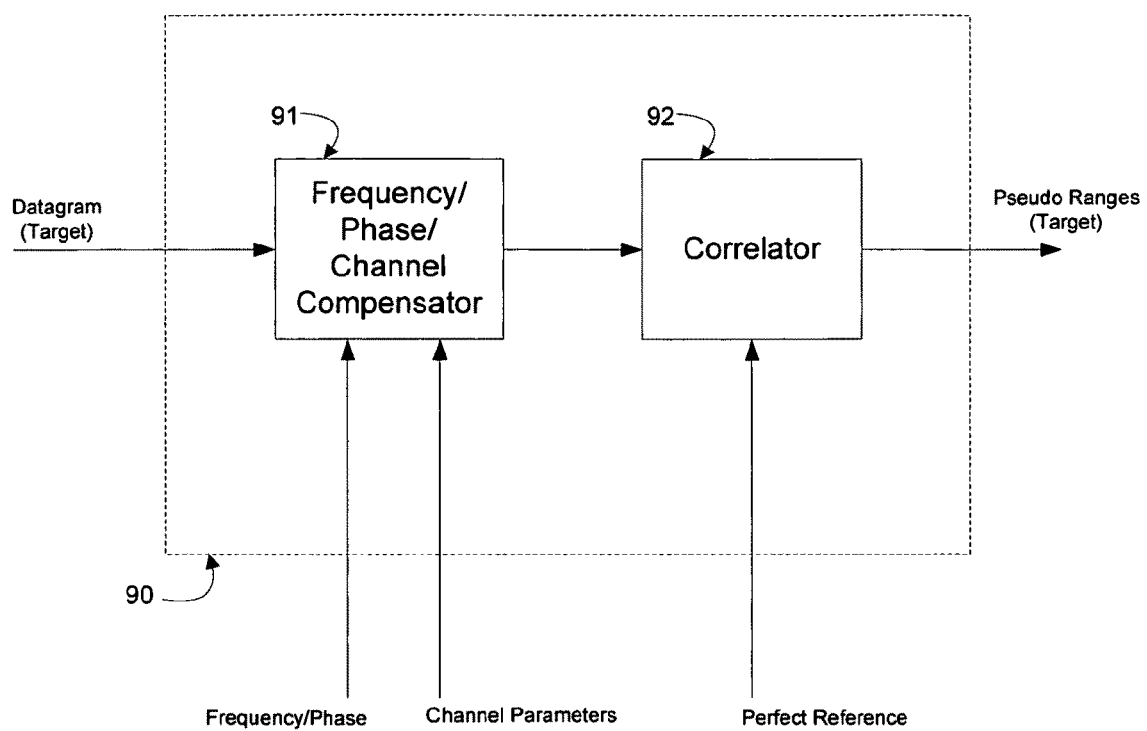
FIG. 9 shows a block diagram of a pseudo range engine utilizing the perfect reference.

As shown in FIG. 9, the availability of a perfect reference dramatically simplifies the extraction of target pseudo ranges from target datagrams. All that remains after compensating for frequency, phase, and channel effects (the function of Frequency/Phase/Channel Compensator 91) is a simple correlation process, wherein the compensated target datagram is correlated (by Correlator 92) with the perfect reference to extract the target pseudo range. The use of a correlator, has the benefit of providing implicitly, a particularly useful metric for the quality of the pseudo range estimate; namely, the correlation peak/average ratio.

This metric allows for the optimal selection of the three (or four) pseudo ranges required to generate the location coordinates of the target GPS sensor. More importantly, it allows for the definition of a usability threshold for pseudo ranges, with operational as well as performance implications. To illustrate, the Perfect Reference Engine 80 may for practical reasons, compute perfect references in sets of say four. Failing to extract three (or four) usable pseudo ranges using a first set of perfect references, the Pseudo Range Engine 90 might then request (from Perfect Reference Engine 80) a second set of perfect ranges, and perhaps, a third, until it determines that a reliable position fix cannot be extracted from the target datagram in question.

A second embodiment of the Pseudo Range Engine (FIG. 13), which employs a compensated perfect reference, simplifies Pseudo Range Engine 90 by eliminating the Frequency/Phase/Channel Compensator 91, albeit at the expense of adding complexity (Frequency/Phase/Channel Compensator 125) to Perfect Reference Engine 80.

A Pseudo Range Engine with Multi-Path Correction

Figure 10:
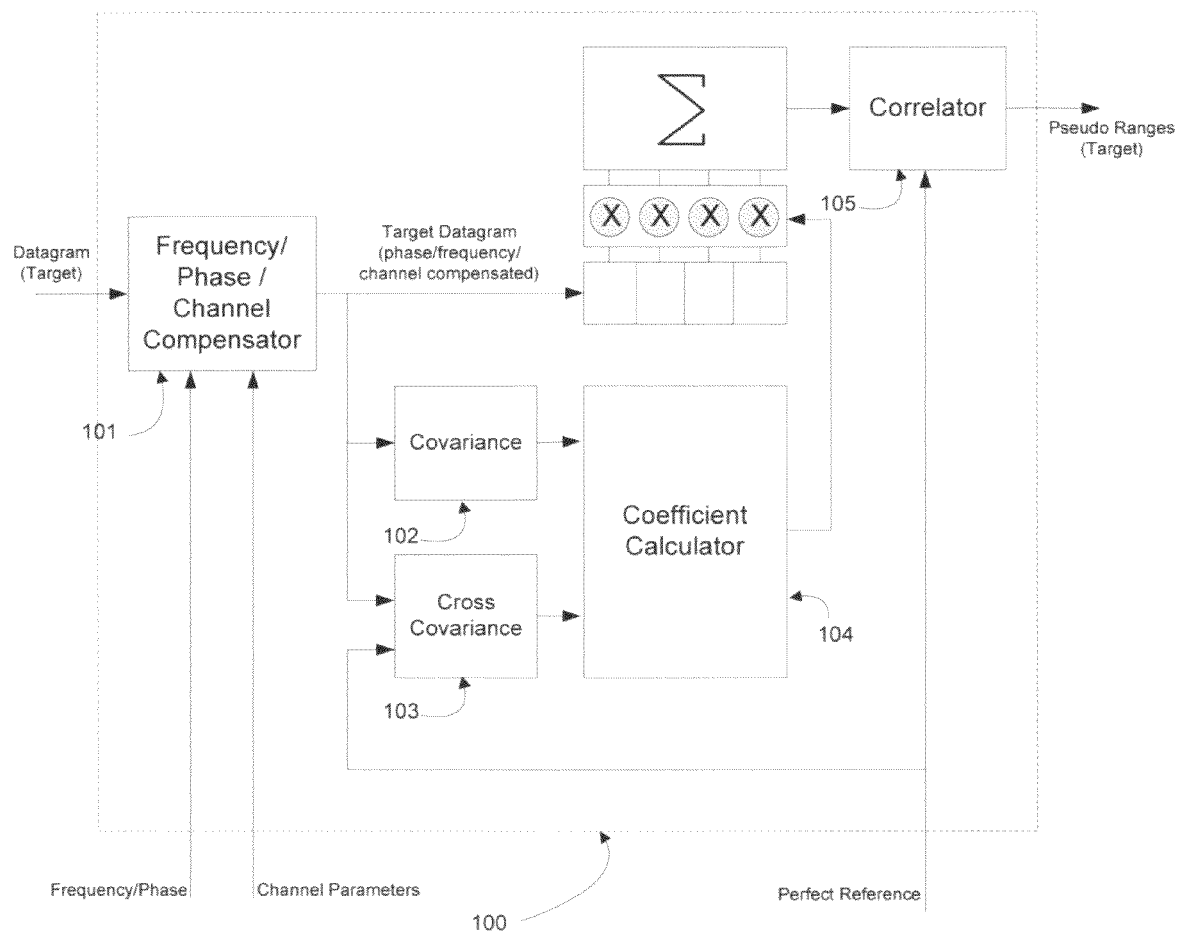
FIG. 10 shows a block diagram of a pseudo range engine incorporating multi-path correction.

FIG. 10 describes Pseudo Range Engine 100, with the capability to isolate and recombine multi-path signals implicit in target datagrams. As with the basic Pseudo Range Engine 90, the target datagram is first compensated for frequency, phase, and channel effects using Frequency/Phase/Channel Compensator 101. The resulting datagram is then reconstituted via a weighted summing process, where the weighting coefficients are derived through a process proceeding with the computation of the covariance (Covariance block 102) of the compensated target datagram and the cross-covariance (Cross-Covariance block 103) of the compensated target datagram with the perfect reference. The weighting coefficients follow by computing the product of the inverse of the covariance matrix and the cross-covariance (Coefficient Calculator 104).

The multi-path-corrected target datagram is then correlated with the perfect reference using Correlator 105, a correlator identical to that of the basic Pseudo Range Engine 90, to extract target pseudo ranges and cull from the results, the highest quality three (or four) pseudo range for the generation of a reliable position fix.

The choice of a correlator to extract the target pseudo range from the multi-path-corrected target datagram creates the potential of further enhancement of the quality of the pseudo range estimate through the simultaneous optimization of the multi-path coefficients and the quality metric. In this case, all that is required is to include the coefficient computation within the correlation loop. The covariance matrix would be computed just once; the rest of the computation would be repeated with each iteration of the correlation process. This procedure could be reserved for those occasions when the serialization of weighted summation and correlation fail to provide the requisite number of usable pseudo ranges.

Figure 14:
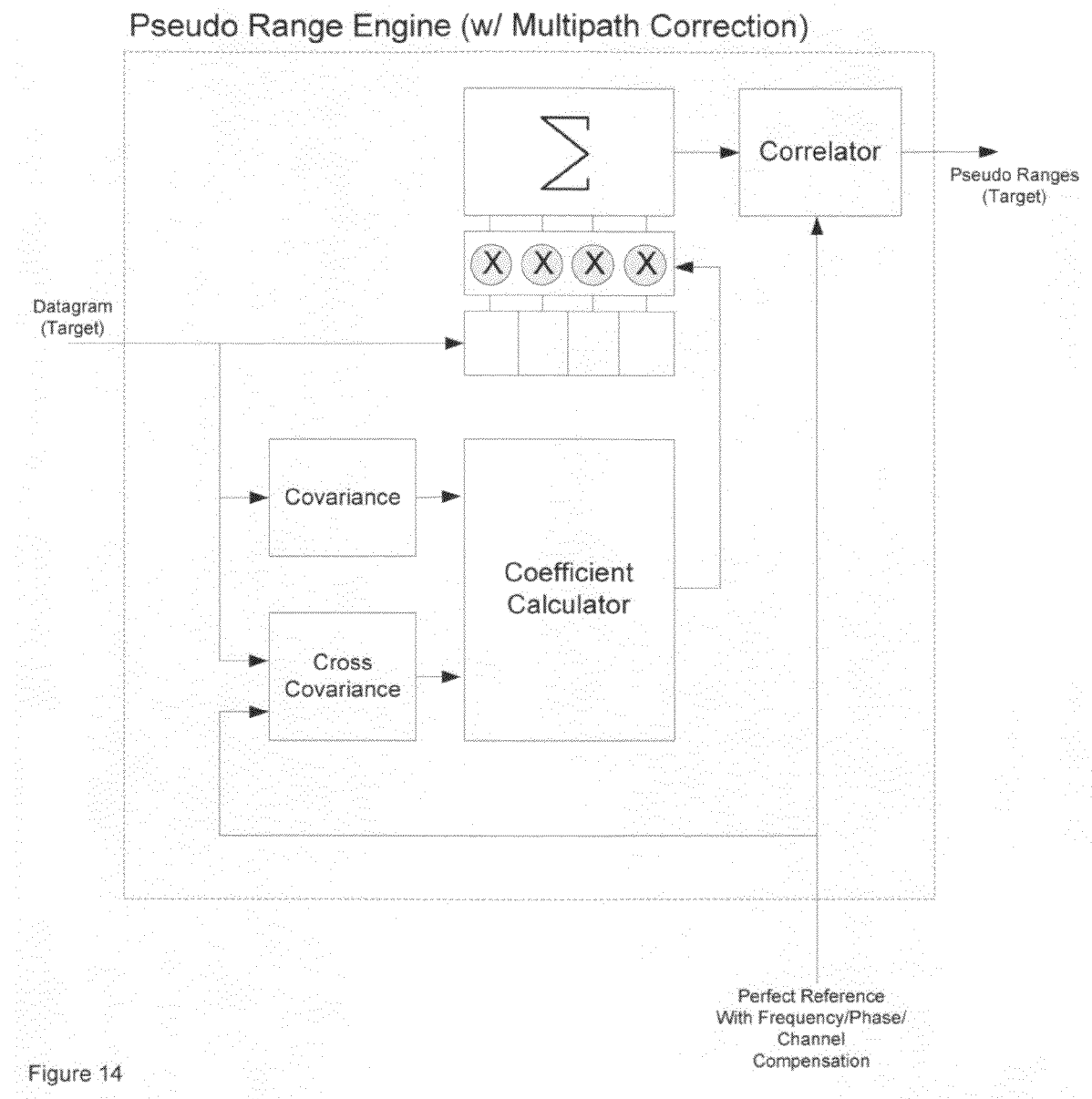
FIG. 14 shows a block diagram of a pseudo range engine incorporating multi-path correction.

A second embodiment of the Pseudo Range Engine with Multi-Path Correction (FIG. 14) simplifies Pseudo Range Engine 100, albeit at the expense of adding complexity to Perfect Reference Engine 80.

In practice, the Datagram Processing Facility is likely to be supported by an operating system such as Windows, UNIX, LINUX, etc. These operating systems will provide much of the process scheduling and table management essential for the efficient operation of the subsystems (of the Datagram Processing Facility) and interactions between the subsystems.

We claim:

1. A method for measuring the pseudo range from a first GPS sensor to a designated navigational satellite, for use in a satellite positioning system (SPS), said method comprising:

receiving at the first GPS sensor a first portion of the signal transmitted by the designated navigational satellite, said first portion spanning multiple cycles of GPS' 50 Hz data overlay;

recording said first portion of the transmitted signal, the recording hereinafter referred to as the first datagram;

extracting the pseudo range from the first datagram using a signal processing technique employing a perfect reference, wherein:

said perfect reference is generated from a second datagram received and recorded at a second GPS sensor, said second datagram spanning multiple cycles of GPS' 50 Hz data overlay; and wherein:

the first datagram and the second datagram overlap at least partially in time.

2. A system for measuring the pseudo range from a first GPS sensor to a designated navigational satellite, for use in a satellite positioning system (SPS), said system comprising:

first and second GPS sensors for receiving and recording first and second portions of the signal transmitted by the designated navigational satellite, said first and second portions spanning multiple cycles of GPS' 50 Hz data overlay;

means for recording said first and second portions, the recordings hereinafter referred to as the first and second datagrams;

means for transmitting the first and second datagrams to a datagram processing facility; and a datagram processing facility wherein:

a perfect reference is generated from the second datagram, and wherein:

the pseudo range from the first GPS sensor to the designated navigational satellite is extracted from the first datagram using a signal processing technique employing the perfect reference.

3. A datagram processing facility for extracting the pseudo range from a first GPS sensor to a designated navigational satellite from a first datagram originating with said first GPS sensor, said facility comprising:

a pseudo range engine for extracting a pseudo range from said first datagram originating with said first GPS sensor, the extraction accomplished with the aid of a perfect reference, and a perfect reference engine for generating a perfect reference from a second datagram originating with a second GPS sensor;

both the first and the second datagrams spanning multiple cycles of GPS' 50 Hz data overlay.

4. A computer-readable storage medium containing an executable computer program which enables a datagram processing facility to:

generate a perfect reference from a second datagram originating with a second GPS sensor designated for the purpose of perfect reference generation, and to extract a pseudo range from a first datagram originating with a first GPS sensor, the location of which is to be determined, the extraction accomplished with the aid of said perfect reference;

both the first and the second datagrams spanning multiple cycles of GPS' 50 Hz data overlay.

* * * * *